United States Patent
Wong et al.

(10) Patent No.: US 7,806,534 B2
(45) Date of Patent: Oct. 5, 2010

(54) AUTO-FOCUSING METHOD AND PROJECTOR USING THE SAME

(75) Inventors: Shih-Fang Wong, Taipei Hsien (TW); Lin-Kun Ding, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 738 days.

(21) Appl. No.: 11/736,005

(22) Filed: Apr. 17, 2007

(65) Prior Publication Data

US 2008/0110265 A1    May 15, 2008

(30) Foreign Application Priority Data

Nov. 10, 2006    (CN) .................... 2006 1 0063576

(51) Int. Cl.
*G03B 3/00* (2006.01)

(52) U.S. Cl. .................... 353/101; 353/69; 348/745

(58) Field of Classification Search ............ 353/69, 353/101, 122; 348/745, 806; 345/207, 214
See application file for complete search history.

(56) References Cited

U.S. PATENT DOCUMENTS

| 5,479,225 | A | 12/1995 | Kuga |
| 6,422,704 | B1 | 7/2002 | Gyoten et al. |
| 7,092,045 | B2 | 8/2006 | Haruna et al. |
| 2004/0130685 | A1 | 7/2004 | Wu |
| 2005/0195372 | A1* | 9/2005 | Ohara ................... 353/69 |
| 2006/0022680 | A1* | 2/2006 | Suginouchi et al. ...... 324/635 |

* cited by examiner

*Primary Examiner*—Kevin Pyo
(74) *Attorney, Agent, or Firm*—Frank R. Niranjan (57) ABSTRACT

A projector for automatically adjusting images projected onto a screen includes a detecting module for detecting a propagation time for projected ultrasonic waves sent by the projector to be echoed back by the screen and received by the projector, a processing module for calculating a projection distance between the projector and the screen based on the propagation time, and outputting a focal length signal corresponding to the projection distance, an optical module, and an adjusting module for adjusting a local length of the optical module according to the focal length signal. A related method is also provided.

17 Claims, 7 Drawing Sheets

AUTO-FOCUSING METHOD AND PROJECTOR USING THE SAME

BACKGROUND OF THE INVENTION

1. Field of the Invention

This invention generally relates to projectors, and more particularly, to a projector capable of automatically adjusting images projected, and an auto-focusing method used in the projector.

2. Description of Related Art

Using a projector to beam a magnified image on a screen or the like is widely used in many situations such as presentations in businesses, schools, advertisements, and so on.

Conventionally, a manual-focusing method is used to obtain a clear image. A focal length and/or a position of a projection lens of a projector are adjusted manually according to different positions of the projector relative to the screen. This manual-focusing method is cumbersome and time-consuming.

Figure 6:
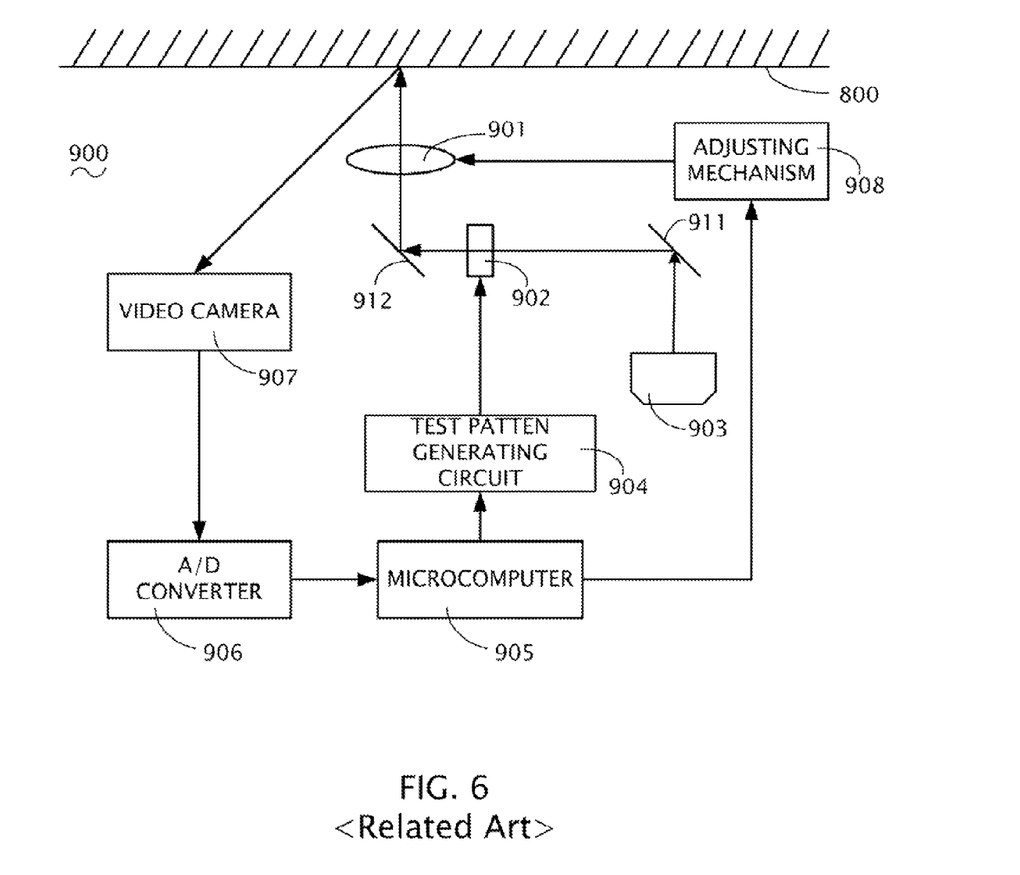
FIG. 6 is a block diagram showing a conventional projector using a video camera.

An auto-focusing method was also proposed. In such a method, a photographic device, for example, a video camera, is used to perform an auto-focusing operation. FIG. 6 shows a video camera 907 being used as a projector 900. The projector 900 includes a projection lens 901, a light valve 902, a light source 903, a test pattern generating circuit 904, a microcomputer 905, an analog to digital (A/D) converter 906, an adjusting mechanism 908, a dichroic mirror 911, and a reflecting mirror 912.

The dichroic mirror 911 reflects a light beam emitted from the light source 903 to the light valve 902. The microcomputer 905 controls the test pattern generating circuit 904 to generate a test pattern on the light valve 902. According to the test pattern, the light valve 902 selectively transmits the inputted light beam. The portion of the inputted light beam that is passed through the light valve 902 is reflected by the reflecting mirror 912, and is sequentially converged to the screen 800 by the projection lens 901 to form a test image on the screen 800. The test image is photographed by the video camera 907. The photographed image is subjected to an A/D conversion by the A/D converter 906 and then the digitized image data are inputted to the microcomputer 905.

The microcomputer 905 compares parameters of the digitized image data with that of the test image data that are pre-installed in the microcomputer 905, including contrast ratio, brightness, and so on. The microcomputer 905 controls the adjusting mechanism 908 to adjust the focal length and/or position of the projection lens 901 based on the analysis results. After adjustment, the projector 900 is in an in-focus state, that is, the image projected onto the screen 800 is clear.

As described above, the projector 900 of the auto-focusing method further requires a video camera 907 to capture the test image projected on the screen 800. When the video camera 907 is oriented to the screen 800 in different directions, the captured test image will have different contrast ratio and brightness. This may cause problems and difficulties for the user to orient the video camera 907 towards the screen 800 correctly.

SUMMARY OF THE INVENTION

It is an aspect of the present invention to provide a method for automatically adjusting images projected onto a screen of a projector. The method includes steps of: projecting ultrasonic waves to the screen and receiving ultrasonic waves reflected by the screen; detecting a propagation time it takes for the projected ultrasonic waves to be received as the reflected ultrasonic waves; calculating a projection distance between the projector and the screen based on the propagation time; and driving an optical module to adjust a focal length corresponding the projection distance.

It is another aspect of the present invention to provide a projector for automatically adjusting images projected onto a screen. The projector comprises a detecting module for detecting a propagation time by transmitting ultrasonic waves and receiving the ultrasonic waves reflected by the screen; a processing module for calculating a projection distance between the projector and the screen based on the propagation time of the ultrasonic waves, and outputting a focal length signal corresponding to the projection distance; an optical module; and an adjusting module for adjusting a focal length of the optical module according to the focal length signal.

BRIEF DESCRIPTION OF THE DRAWINGS

These and other advantages, and features of the present auto-focusing projector will be apparent from the following description taken in conjunction with the accompanying drawings which illustrate a specific embodiment of the invention. In the drawings.

DETAILED DESCRIPTION OF THE INVENTION

Now an embodiment of an auto-focusing projector will be described in conjunction with the accompanying drawings.

Figure 1:
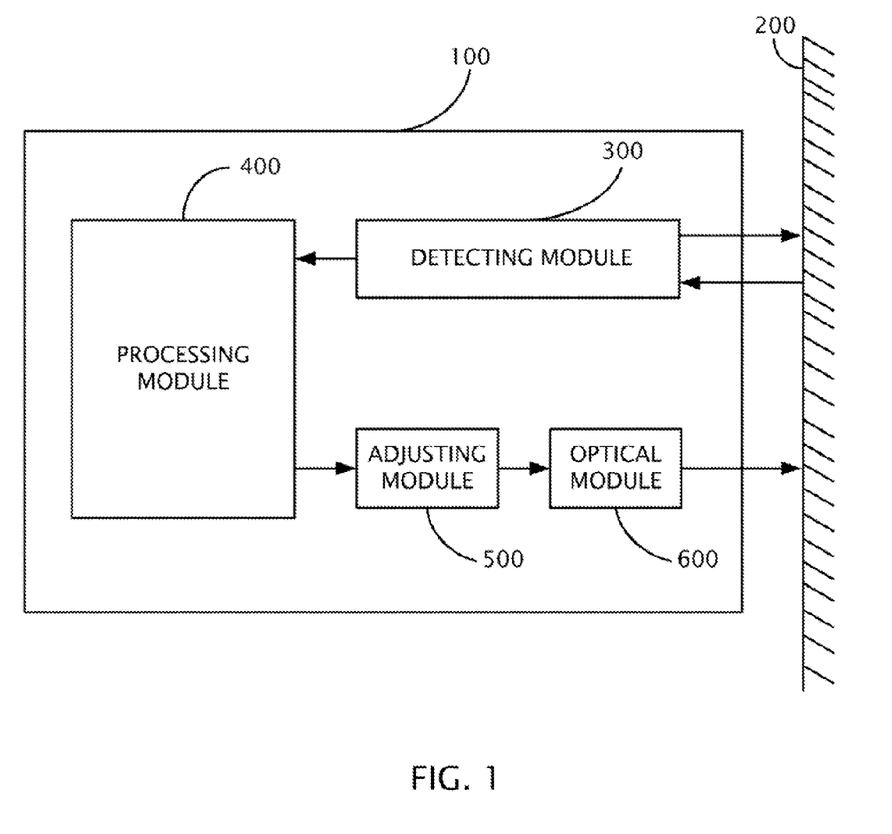
FIG. 1 is a block diagram showing a construction of an auto-focusing projector in accordance with an exemplary embodiment, the auto-focusing projector including a detecting module, a processing module, an adjusting module, and an optical module.

Referring to FIG. 1, an auto-focusing projector 100 that is arranged facing a screen 200 includes a detecting module 300, a processing module 400, an adjusting module 500, and an optical module 600.

The detecting module 300 is used for detecting the propagation time t of a time it takes ultrasonic waves transmitted out of the projector 100 to echo off the screen 200 and return to the projector 100 as reflected ultrasonic waves. The processing module 400 is electrically connected to the detecting module 300. The processing module 400 is configured for receiving data corresponding to the propagation time t from the detecting module 300, and for computing a projection distance s between the projector 100 and the screen 200. The processing module 400 outputs control signals to the adjusting module 500 corresponding to the projection distance s. The adjusting module 500 drives the optical module 600 to adjust optical parameters according to the control signals.

Figure 2:
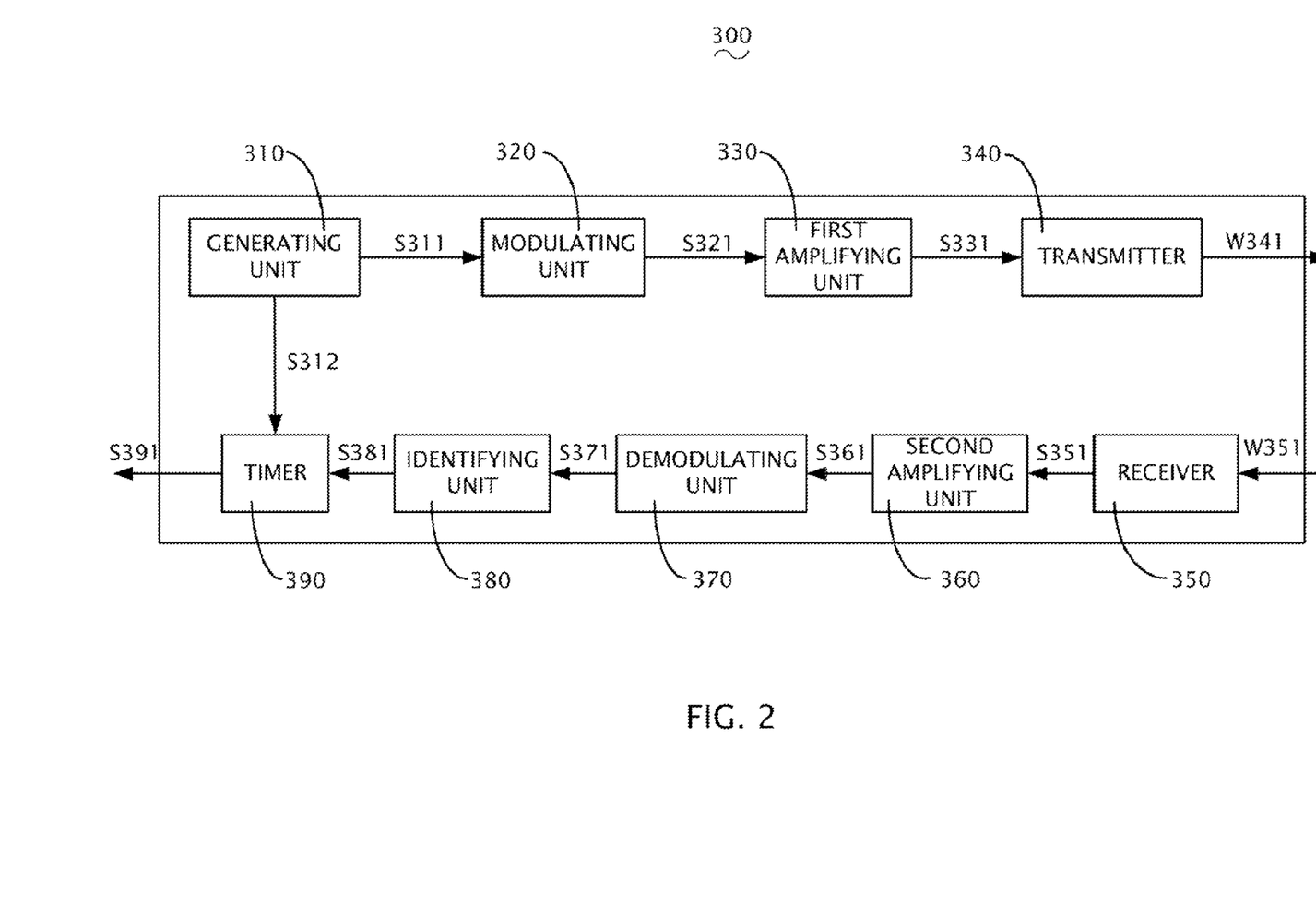
FIG. 2 is a block diagram showing a detailed construction of the detecting module in FIG. 1.

Referring to FIG. 2, the detecting module 300 includes a generating unit 310, a modulating unit 320, a first amplifying unit 330, a transmitter 340, a receiver 350, a second amplifying unit 360, a demodulating unit 370, an identifying unit 380, and a timer 390. The generating unit 310, the modulating unit 320, the first amplifying unit 330, and the transmitter 340 are connected in series in that order. The receiver 350, the second amplifying unit 360, the demodulating unit 370, the identifying unit 380, and the timer 390 are connected in series in that order. The generating unit 310 and the timer 390 are also electrically coupled.

The generating unit 310 is used for generating a low-frequency ultrasonic signal, for example, 20 Hz, and a time driving signal at a high level or a low level. The modulating unit 320 is used for generating a relatively higher-frequency carrier signal, for example, 40 KHz. The first amplifying unit 330 is used for amplifying the modulated ultrasonic signal thereby yielding an amplified ultrasonic signal. The transmitter 340 is a first transducer made of piezoelectric ceramic materials etc., and is used for converting the amplified ultrasonic signal into the projected ultrasonic waves through resonant characteristics of the piezoelectric ceramic materials.

The receiver 350 is a second transducer that is also made of the piezoelectric ceramic materials etc., and is used for converting the reflected ultrasonic waves to a received ultrasonic signal through the resonant characteristics of the piezoelectric ceramic materials. The second amplifying unit 360 is used for amplifying the received ultrasonic signal thereby yielding an amplified received ultrasonic signal. The demodulating unit 370 is used for demodulating the amplified received ultrasonic signal thereby yielding a demodulated received ultrasonic signal. The identifying unit 380 is used for identifying the demodulated received ultrasonic signal according to the frequency characteristics. The timer 390 is used for deriving the propagation time t.

Hereinafter, an operation of the detecting module 300 will be described in detail.

The generating unit 310 generates two signals: an ultrasonic signal S311 at the frequency of 20 Hz that is fed to the modulating unit 320, and a time driving signal S312 at the high level that is fed to the timer 390. The timer 390 starts timing after receiving the time driving signal S312, and sets an initial time value $t_1$. The modulating unit 320 generates the carrier signal at the frequency of 40 KHz. The amplitude of the carrier signal is varied by the ultrasonic signal S311 over a periodic time interval of 0.05 s thereby yielding a modulated ultrasonic signal S321. The first amplifying unit 330 receives the modulated ultrasonic signal S321, and outputs an amplified ultrasonic signal S331 to the transmitter 340. The transmitter 340 converts the amplified ultrasonic signal S331 to projected ultrasonic waves W341. The projected ultrasonic waves W341 are projected towards the screen 200.

The receiver 350 receives the ultrasonic waves W351 reflected by the screen 200 (see FIG. 1), and converts the reflected ultrasonic waves W351 to the received ultrasonic signal S351 through the resonant characteristics. The received ultrasonic signal S351 oscillates at the frequency of 40 kHz over the periodic time interval of 0.05 s. The second amplifying unit 360 amplifies the received ultrasonic signal S351 so as to compensate for energy attenuation of the projected ultrasonic waves W341 or the reflected ultrasonic waves W351 while transmitting through air. The demodulating unit 370 extracts a demodulated ultrasonic signal S371 from the amplified ultrasonic signal S361. The identifying unit 380 responds to the demodulated ultrasonic signal S371 at 20 Hz, and outputs a driving signal S381 to the timer 390. The timer 390 stops timing once the driving signal S381 is received and registers a time value $t_2$. As a result, the propagation time is obtained by subtracting the time value $t_1$ from the time value $t_2$ ($t=t_2-t_1$), and a propagation time signal S391 is outputted.

As described above, the transducer unit in the transmitter 340 converts electrical signal to wave vibration, however, the transducer unit can also convert wave vibration to electrical signal. As such, the transmitter 340 can function as transmitter 340 and as receiver 350. In other words a single transducer unit can replace the transmitter 340 and the receiver 350.

Figure 3:
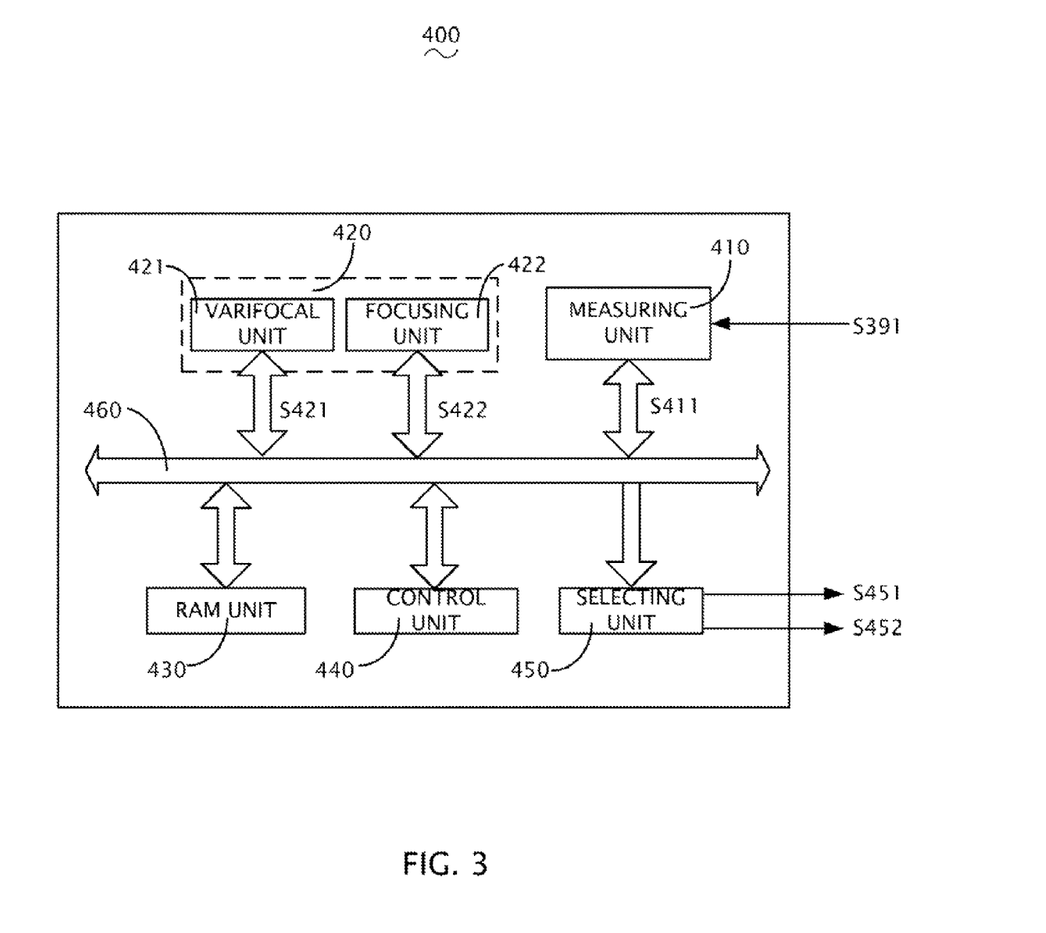
FIG. 3 is a block diagram showing a detailed construction of the processing module in FIG. 1.

Referring to FIG. 3, the processing module 400 includes a measuring unit 410, a read-only memory (ROM) unit 420, a random access memory (RAM) unit 430, a control unit 440, and a selecting unit 450 coupled to a bus 460. The measuring unit 410 is used for calculating the projection distance s between the projector 100 (see FIG. 1) and the screen 200 (see FIG. 1). The projection distance s is derived with the equation s=v·t/2, where v is the transmission speed and t is the propagation time. Under normal conditions the value of v is 340 meters per second.

The RAM unit 430 is a memory for storing programs to be executed and/or data to be processed. The ROM unit 420 is pre-installed with the programs and the data, and includes a varifocal unit 421 and a focusing unit 422. A first table of different focal length value and a second table of different lens position value corresponding to different projection distance are stored in the varifocal unit 421 and the focusing unit 422 respectively. The control unit 440 manages instructions to be executed and the data to be transferred. The selecting unit 450 is configured for retrieving the focal length and the lens position from the first table and the second table respectively according to the projection distance, and outputting the control signals corresponding to the retrieved focal length and the lens position.

Now, the operation of the processing module 400 will be described in detail.

After signaled by the control unit 440, the programs stored in the ROM unit 420 are loaded into the RAM unit 430, the RAM unit 430 then executes the programs.

The measuring unit 410 calculates the projection distance based on the propagation time signal S391. The control unit 440 signals the measuring unit sending the projection distance signal S411 to the selecting unit 450 through the bus 460. The selecting unit 450 retrieves a focal length and a lens position respectively from the first table and the second table according to the projection distance. A focal length signal S451 and a lens position signal S452 are outputted to the adjusting module 500 (see FIG. 4).

Figure 4:
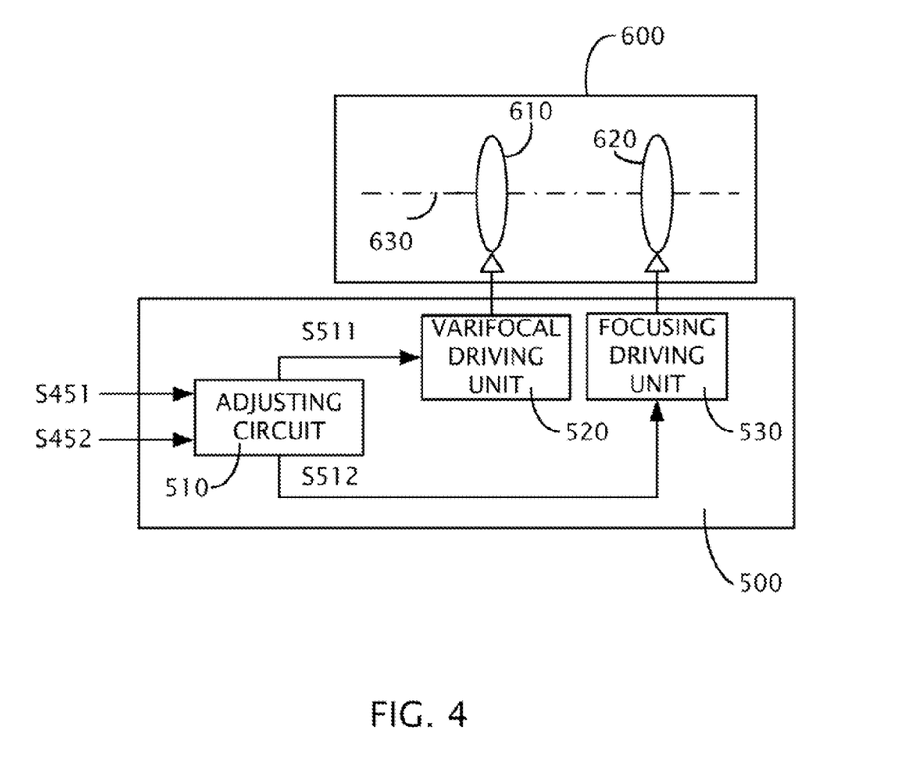
FIG. 4 is a block diagram showing a detailed construction of the adjusting module and optical module in FIG. 1.

Referring to FIG. 4, the adjusting module 500 includes an adjusting circuit 510, a varifocal driving unit 520 and a focusing driving unit 530. The varifocal driving unit 520 and the focusing driving unit 530 are electrically connected to the adjusting circuit 510. The varifocal driving unit 520 and the focusing driving unit 530 can be, for example, a stepper motor that moves a predetermined number of steps corresponding to an applied voltage or an applied current.

The optical module 600 includes a varifocal lens 610, and a focusing lens 620 disposed along an optical axis 630. The varifocal lens 610 is configured with an adjustable focal length. The focal length of the varifocal lens 610 is adjustable by actuating the varifocal driving unit 520. The focusing lens 620 is movable along the optical axis 630 by actuating the focusing driving unit 530 to change the position of the lens.

Now, the operation of the adjusting module 500 and the optical module 600 will be described in detail.

The adjusting circuit 510 feeds a varifocal adjusting signal S511 and a focusing adjusting signal S512 to the varifocal driving unit 520 and the focusing driving unit 530 respectively. The varifocal driving unit 520 receives the varifocal adjusting signal and changes the focal length of the varifocal lens 610 according to the value of the varifocal adjusting signal S511. The focusing driving unit 530 moves the focusing lens 620 along the optical axis 630 such that the position of the focusing lens 620 is changed according to the value of the focusing adjusting signal S512. The varifocal driving unit 520 and the focusing driving unit 530 are deactivated when the focal length of the varifocal lens 521 and the lens position of the focusing lens 522 correspond to the projection distance, thus, projecting a clear image onto the screen 200 (see FIG. 1).

Figure 5A:
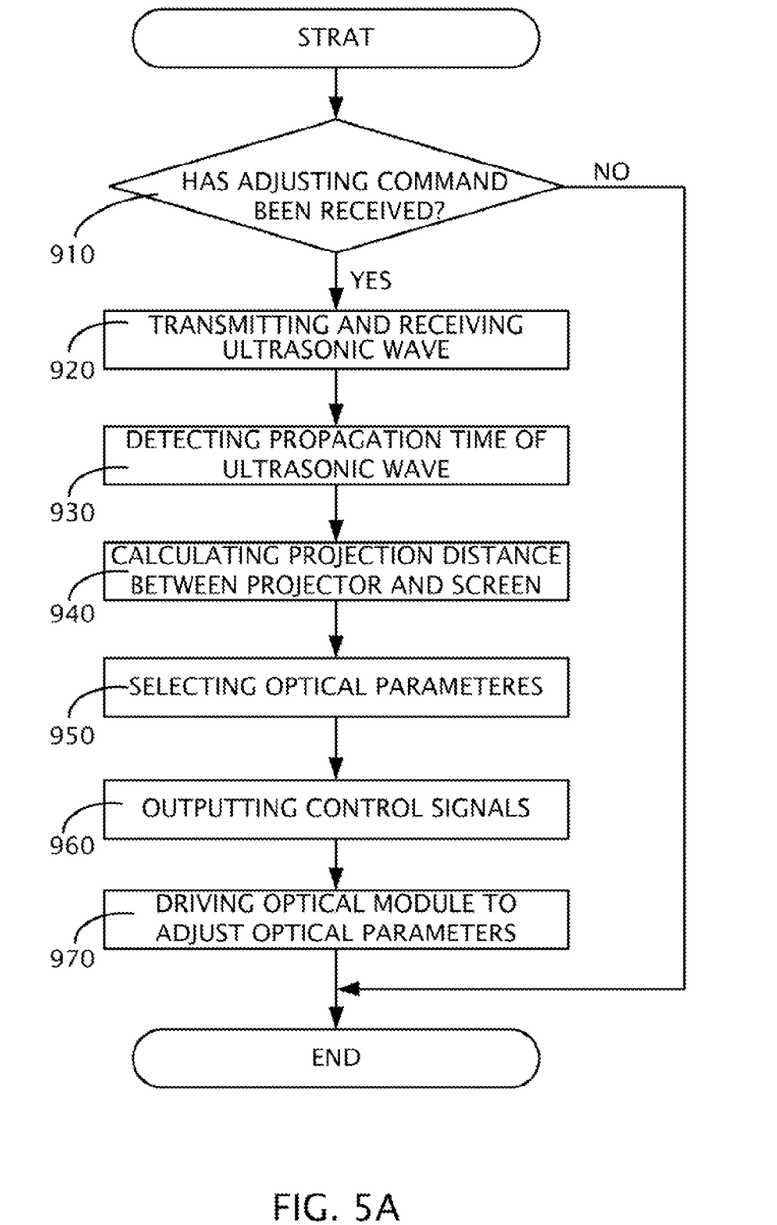
FIG. 5A is a flowchart showing an auto-focusing process of the projector in accordance with an exemplary embodiment.

Referring to FIG. 5A and FIG. 1, a flowchart depicts a process for an auto-focusing of the projector 100. The projector 100 start working when power is supplied. In step 910, the projector 100 checks if an adjusting command is received. When the image projected onto the screen 200 is clear, no adjusting command is received by the projector 100, and the procedure goes directly to end. When the image projected onto the screen 200 is blurred, an adjusting command is given by the user.

In step 920, the detecting module 300 transmits the projected ultrasonic waves and receives the reflected ultrasonic waves after receiving the adjusting command.

In step 930, the detecting module 300 detects the propagation time for the projected ultrasonic waves sent by the projector 100 to be echoed back by the screen 200 and received by the projector 100.

In step 940, The processing module 400 calculates the projection distance between the projector 100 and the screen 200 based on the propagation time.

In step 950, the processing module 400 outputs the control signals comprising the focal length signal and the lens position signal corresponding to the calculated projection distance.

In step 960, the adjusting module 500 drives the optical module 600 to adjust optical parameters according to the control signals outputted from the processing module 400. The adjusting circuit 510 feeds the varifocal adjusting signal S511 to the varifocal driving unit 520 to change the focal length of the varifocal lens 610. The adjusting circuit 510 feeds the focusing adjusting signal S512 to change the lens position of the focusing lens 620.

Figure 5B:
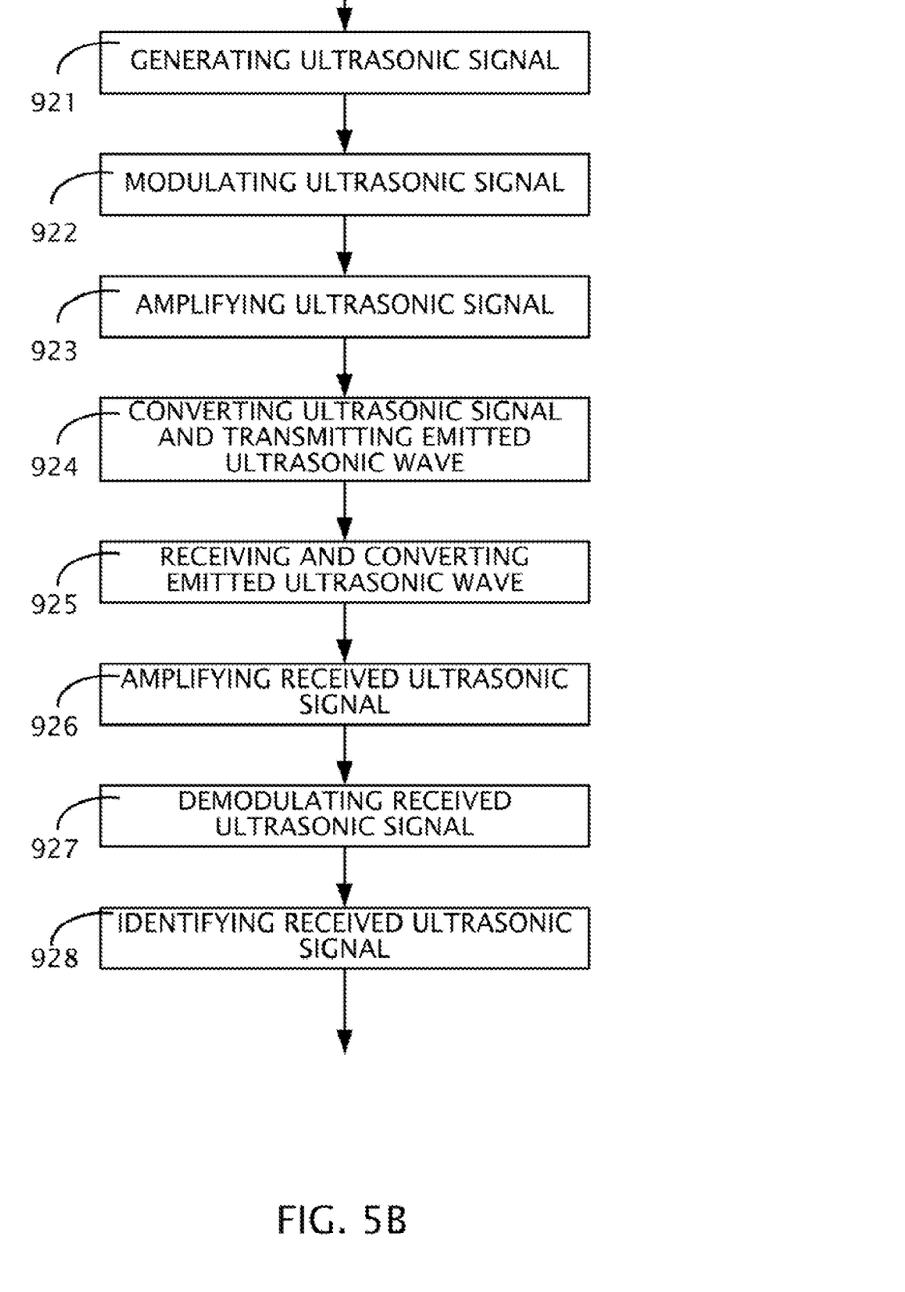
FIG. 5B is a flowchart showing the process of transmitting and receiving ultrasonic waves in FIG. 5A.

FIG. 5B shows step 920 in FIG. 5A in detail. In step 921, the generating unit 310 generates an ultrasonic signal.

In step 922, the modulating unit 320 generates a carrier signal which is modulated by the generated ultrasonic signal to form a modulated ultrasonic signal.

In step 923, the first amplifying unit 330 amplifies the modulated ultrasonic signal.

In step 924, the transmitter 340 converts the amplified ultrasonic signal to the projected ultrasonic waves that are transmitted towards the screen 200.

In step 925, the receiver 350 receives and converts the reflected ultrasonic waves to the received ultrasonic signal.

In step 926, the second amplifying unit 360 amplifies the received ultrasonic signal.

In step 927, the demodulating unit 370 demodulates the amplified received ultrasonic signal.

In step 928, the identifying unit 380 identifies the demodulated received ultrasonic signal.

As the apparatus and method for auto-focusing described above, the present projector 100 detects the propagation time of the ultrasonic waves by the detecting module 300 through transmitting the ultrasonic waves and receiving the reflected ultrasonic waves, and calculates the projection distance between the projector 100 and the screen 200 based on the propagation time. The variable projection distance between the projector 100 and the screen 200 has a direct relationship with the variable focal length of the varifocal lens and the variable position of the focusing lens. It is appreciated that much time is saved by selecting the focal length and the lens position respectively from a first table and a second table pre-installed in the processing module 400 with respect to the projection distance. Therefore, auto-focusing is performed by driving the optical module 600 by the adjusting module 500 according to the control signals outputted from the processing module 400.

Other embodiments of the present invention will be appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method for automatically adjusting images projected onto a screen, comprising:
    projecting ultrasonic waves to the screen and receiving ultrasonic waves reflected by the screen;
    detecting a propagation time it takes for the projected ultrasonic waves to be received as the reflected ultrasonic waves;
    calculating a projection distance between the projector and the screen based on the propagation time, and outputting a focal length control signal corresponding to the projection distance; and
    driving an optical module to adjust a focal length of the optical module according to the focal length signal.

2. The method as claimed in claim 1, wherein the step of projecting ultrasonic waves and receiving the ultrasonic waves reflected by the screen comprises:
    generating an ultrasonic signal;
    converting the ultrasonic signal to the projected ultrasonic waves;
    projecting the ultrasonic waves;
    receiving the ultrasonic waves reflected by the screen; and
    converting the ultrasonic waves received to a received ultrasonic signal.

3. The method as claimed in claim 2, further comprising: modulating the generated ultrasonic signal.

4. The method as claimed in claim 3, further comprising: amplifying the modulated ultrasonic signal.

5. The method as claimed in claim 4, further comprising: demodulating the received ultrasonic signal.

6. The method as claimed in claim 5, further comprising: amplifying the received ultrasonic signal after demodulation.

7. The method as claimed in claim 6, further comprising: identifying the received ultrasonic signal after amplification.

8. A projector, comprising:
    a detecting module for computing a propagation time by transmitting ultrasonic waves to a screen and receiving ultrasonic waves reflected by the screen;
    a processing module for calculating a projection distance between the projector and the screen based on the propagation time, and outputting a focal length signal corresponding to the projection distance;
    an optical module; and
    an adjusting module for adjusting a focal length of the optical module according to the focal length signal.

9. The projector as claimed in claim 8, wherein the processing module also outputs a lens position signal corresponding to the projection distance between the projector and the screen.

10. The projector as claimed in claim 9, wherein the optical module comprising a lens, the lens position signal is output to the adjusting module, and the adjusting module is configured for driving the optical module to adjust a position of the lens according to the lens position signal.

11. The projector as claimed in claim 8, wherein the detecting module comprises a timer for detecting the propagation time for transmitting the ultrasonic waves to the screen and receiving the ultrasonic waves returned from the screen.

12. The projector as claimed in claim 8, wherein the detecting module comprises a generating unit for generating an ultrasonic signal, a transmitter for converting the ultrasonic signal to the ultrasonic waves that are transmitted, and a receiver for converting the ultrasonic waves received to a received ultrasonic signal.

13. The projector as claimed in claim 12, wherein the detecting module further comprises a modulating unit for generating a carrier signal, which is modulated by the ultrasonic signal to form a modulated ultrasonic signal, and a demodulating unit for demodulating the received ultrasonic signal.

14. The projector as claimed in claim 13, wherein the detecting module further comprises a first amplifying unit coupled between the modulating unit and the transmitter for amplifying the modulated ultrasonic signal.

15. The projector as claimed in claim 14, wherein the detecting module further comprises a second amplifying unit coupled between the receiver and the demodulating unit for amplifying the received ultrasonic signal.

16. The projector as claimed in claim 15, wherein the detecting module further comprises an identifying unit for identifying the received ultrasonic signal after demodulation.

17. The method as claimed in claim 1, further comprising: driving the optical module to adjust a lens position corresponding to the projection distance.

* * * * *